3,151,165
NITRAZA POLYMER COMPOSITIONS
George D. Sammons, Waco, Tex., assignor to Phillips Petroleum Company, a corporation of Delaware
No Drawing. Filed Jan. 25, 1960, Ser. No. 4,573
7 Claims. (Cl. 260—583)

This invention relates to nitraza polymer compositions. In one aspect this invention relates to a method of preparing nitraza type polymers. In another aspect this invention relates to composite type propellant compositions wherein said nitraza polymer compositions are utilized as a portion of the oxidizer component.

In recent years, great interest has developed in solid propellants for jet propulsion devices such as missiles, rocket motors, gas generators, and the like. One type of solid propellant which has received considerable attention is that of the composite type, a typical composite propellant being one that uses an organic material as the fuel and binder, and a solid oxidant such as ammonium perchlorate or ammonium nitrate. There is a continuing search for materials that combine fuel elements, such as hydrocarbon elements, with a source of oxygen so that an oxidation reaction can take place between the constituents of the material. When particularly desirable elemental combinations exist, very high energy releases are obtained per unit weight and unit volume of the material, and such materials are very satisfactory for use in propellant compositions for the propulsion of rockets, generation of gases in gas generators, etc.

I have discovered a new nitraza polymer composition which combines hydrocarbon elements with a source of oxygen in the same molecule, and which is eminently suitable for use in composite type propellants. Said nitraza polymeric material can be used to replace a portion of the conventional solid inorganic oxidizing salts normally used as the oxidant component in composite type propellants.

Thus, broadly speaking, the present invention resides in new nitraza polymeric compositions of matter, a method of preparing said nitraza polymeric materials, and a propellant composition wherein said nitraza polymeric materials are utilized as a portion of the oxidant component.

An object of this invention is to provide a new nitraza polymeric composition of matter. Another object of this invention is to provide a method of preparing said nitraza polymeric composition of matter. Another object of this invention is to provide a propellant composition of the composite type wherein said nitraza polymeric composition of matter is utilized as a portion of the oxidant component. Other aspects, objects and advantages of the invention will be apparent to those skilled in the art in view of this disclosure.

Thus, according to the invention there is provided a nitraza polymeric composition of matter characterized by the formula

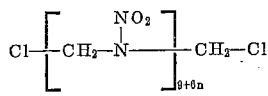

wherein $n$ is an integer of from 0 to 10. A more preferred range for the value of $n$ in the above formula is from 2 to 5. It is within the scope of the invention, however, to prepare nitraza polymeric compositions of matter where said $n$ is greater than 10. For example, $n$ can be as high as 33 or even higher.

Further according to the invention there is provided a method of preparing said nitraza polymeric compositions of matter which comprises reacting 1,7-dichloro-2,4,6-trinitrazaheptane with disodium 1,3,5-trinitrazapentane.

Still further according to the invention there is provided a propellant composition comprising: an oxidizer component consisting essentially of a mixture of a solid inorganic oxidizing salt and said nitraza polymeric composition of matter, said polymer being present in said mixture in an amount in the range of 5 to 150 parts by weight per 100 parts by weight of said solid inorganic oxidizing salt, and a binder component comprised of a rubbery material.

The 1,7-dichloro-2,4,6-trinitrazaheptane, referred to hereinafter for convenience as GSX, can be prepared by the reaction of 1,7-diacetoxy-2,4,6-trinitrazaheptane, referred to hereinafter as BSX, with hydrogen chloride. Said BSX can be prepared by reacting nitric acid, acetic anhydride, and hexamethylenetetramine. The disodium 1,3,5-trinitrazapentane, referred to hereinafter as Na₂BSX, is prepared by the reaction of BSX with sodium alkoxide.

An example of the preparation of said BSX is as follows: 90 milliliters (2.15 mols) of 98–100 percent nitric acid is added carefully to 240 milliliters (2.35 mols) of acetic anhydride while stirring and cooling to 5–15° C. A solution of 66.8 grams (0.48 mol) of hexamethylenetetramine in 110 milliliters (1.93 mols) of acetic acid is then added while maintaining the temperature between 10 and 20° C. The mixture is then heated to 75° C. for 15 minutes, cooled as rapidly as possible to 60° C., and then allowed to cool overnight to room temperature. The precipitate is filtered off and washed with 20 milliliters of acetic acid. The product is recrystallized (without drying) from 250 milliliters of acetic acid, washed with 20 milliliters of methanol, then slurried with 100 milliliters, of hot methanol, and then air dried. Yields in the order of 64 percent of theoretical, based on one mol of hexamethylenetetramine, and having a melting point in the order of 155.0 to 155.5° C. are obtained by this procedure.

An example of the preparation of said GSX is as follows: 500 grams of BSX, 1250 milliliters of ethylene dichloride, and 235 grams of dry HCl are charged to a two-quart Hastelloy lined autoclave equipped with a 500 r.p.m. propeller type stirrer. The mixture in said autoclave is heated at 120° C. (250 p.s.i.g. maximum pressure) for 30 minutes. The mixture is then cooled by means of water circulating in a jacket surrounding the autoclave, the excess HCl is vented off, and crude GSX is crystallized out by chilling at 0° C. for two days. After washing twice with diethylether the yield of crude GSX is 378.8 grams and has a melting point of from 141–149° C.

An example of the preparation of said Na₂BSX is as follows: 8 grams of BSX is dissolved in 100 milliliters of dioxane and to this solution there is added the reaction product of 1.2 grams of sodium and 100 milliliters of absolute methanol. The resulting mixture is allowed to stand at room temperature for about 10 minutes and is then poured into three liters of ethyl ether and cooled to 0° C. The cooled mixture is then filtered to separate the gummy precipitate. Said precipitate is dissolved in 70 milliliters of water and filtered again. The filtrate from the second filtration is then added to 800 milliliters of acetone, cooled to 0° C., and the product Na₂BSX filtered off.

While said Na₂BSX can be represented by the formula

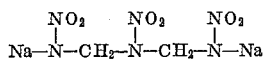

strictly speaking, said formula is not accurate because the sodium is not attached directly to the nitrogen by a valence bond as it there indicated. Said above formula is sometimes used, however, for convenience. Said Na₂BSX is an "ionized" product and a more correct representation of its structure is as follows:

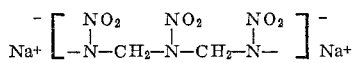

Said GSX can be represented by the formula:

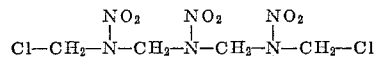

Said BSX can be represented by the formula:

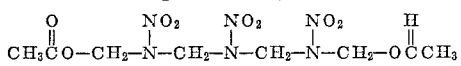

In the above formula for the nitraza polymeric compositions of matter of the invention, the GSX groups are always terminal in the product, and since said GSX groups and the $Na_2BSX$ residues alternate, each increment of growth in the polymer will involve one GSX group and one BSX residue, each of which includes three [—$CH_2$—$N(NO_2)_2$—] groups. Therefore, the minimum number of [—$CH_2$—$N(NO_2)_2$—] groups which can be present in the polymer is nine and said polymer grows from said nine groups in increments of six groups. Thus, the subscript applied to the brackets around the [—$CH_2$—$N(NO_2)_2$—] groups in the above formula is $9+6n$.

The following example illustrates one method of preparing the nitraza polymeric compositions of the invention.

Example 1

5.6 grams of GSX is dissolved in 80 milliliters of acetone and 4.4 grams of freshly prepared $Na_2BSX$, in finely divided form, is added to the solution to form an admixture. Said admixture is then refluxed at atmospheric pressure with vigorous stirring for six hours. After standing overnight at room temperature the solid material (product plus sodium chloride) was filtered off and slurried with water to dissolve said sodium chloride. Said water slurry was then filtered to separate the desired product as a precipitate. Said precipitate was washed with methanol and then with ethyl ether, after which it was vacuum dried to a constant weight of 3.7 grams. The product obtained was a crystalline solid which decomposed, without melting at 235° C.

The following analysis was obtained:

|   | Polymer | | Starting Materials Calculated | |
|---|---|---|---|---|
|   | Calculated [1] | Found | GSX | $Na_2BSX$ |
| C | 16.2 | 17.2 | 15.6 | 9.5 |
| H | 2.7 | 3.2 | 2.6 | 1.6 |
| N | 37.9 | 36.1 | 27.4 | 33.1 |

[1] On basis of (—$CH_2$—$\underset{N}{N}O_2$—) unit.

In the preparation of the nitraza polymeric compositions of matter, stirring of the reaction mixture, while not essential, is preferred because the reaction is effected between a solid ($Na_2BSX$) and a solution of the GSX in a suitable solvent. Said reactants can be reacted in any practical mol ratio. It has been found that a GSX to $Na_2BSX$ mol ratio in the range of from 0.8:1 to 2.0:1 is a practical range. A more preferred range is the range of 1:1 to 1.8:1.

The reaction can be carried out for any suitable period of time, usually from 1 to 24 hours, preferably from 2 to 6 hours. The temperature of the reaction can be from 25 to 80° C., preferably from 40 to 60° C. The particle size of the $Na_2BSX$ can range from 1 to 300 microns, preferably from 5 to 50 microns.

The reaction can be carried out in the presence of any suitable organic solvent. Any solvent which is nonreactive with the reagents being used or the product being prepared, i.e., which is inert under the reaction conditions, is a suitable solvent. Examples of suitable solvents are: acetone, dioxane, methanol, and tetrahydrofuran.

The water used to slurry the product plus sodium chloride can be used at any convenient temperature in the range of about 25 to about 80° C. and the quantity used will depend somewhat upon the temperature, but in general the weight of the water used should be from about 10 to about 1000 times the weight of the precipitate. This water washing operation can advantageously be performed in several stages.

The final product is washed or slurried with from 1 to 10 times its weight of methanol, ethanol, acetone, tetrahydrofuran, or dioxane, followed, if desired, with ethyl ether. This portion of the procedure is a well known technique to expedite the removal of moisture. The product remains insoluble at all stages and final drying of said product can be under reduced pressure or at elevated temperatures, not to exceed about 150° C.

As mentioned, the nitraza polymeric compositions of the invention can be used in composite type propellants. When so used it is convenient to consider the nitraza polymeric composition of matter as a portion of the oxidizer component of said propellants. Thus, said nitraza polymeric products are utilized in combination with solid inorganic oxidizing salts and can replace up to 60 weight percent of said inorganic oxidizing salts. Stated another way, the nitraza polymeric products are used in an amount in the range of 5 to 150 parts by weight per 100 parts by weight of said solid inorganic oxidizing salts. The total oxidizer content of the propellant compositions of the invention, i.e., the total of said solid inorganic oxidizing salts and said nitraza polymeric products, is from 50 to 95 weight percent of the total propellant composition.

Solid inorganic oxidizers which are applicable in the solid propellant compositions of the invention include, among others, ammonium nitrate, the alkali metal nitrates, ammonium perchlorate, and the alkali metal perchlorates. As used herein, the term "alkali metal" includes sodium, potassium, lithium, cesium, and rubidium. Ammonium nitrate and ammonium perchlorate are presently preferred oxidizers. Mixtures of said oxidizers are also applicable. In the preparation of the solid rocket propellant compositions of the invention, said oxidizers are ground to a particle size preferably within the range between 20 and 200 microns average particle size. The most preferred particle size is from about 40 to about 60 microns. It is frequently preferred to use a phase stabilized ammonium nitrate. One method of phase stabilizing ammonium nitrate comprises mixing about 10 parts by weight of a potassium salt (usually potassium nitrate) with about 90 parts by weight of ammonium nitrate along with some water, heating the mixture to about 140° F., drying, and then grinding the resulting mixture to the desired particle size.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue, is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, is usually in the range of 0 to 10 weight percent based on the total propellant composition.

It is also within the scope of the invention to include high energy additives such as finely divided aluminum, magnesium, boron and other finely divided metals in the propellant compositions of the invention. Said finely divided high energy additives will usually have a particle size within the range of 1 to 50 microns and will usually be used in amounts within the range of 0 to 20 weight percent based on the total propellant composition.

The binder component of the propellant compositions of the invention can comprise any suitable flexible rubbery material. Examples of suitable flexible rubbery materials include, among others, natural rubber, synthetic rubbery polymers, or a mixture of natural rubber and said rubbery polymer. Thus, the invention is not limited to any specific rubbery material. Some examples of suitable rubbery polymers are polybutadiene, polyisobutylene, polyisoprene, copolymers of isobutylene and isoprene, copolymers of conjugated dienes with comonomers such as styrene or acrylic acid.

Said synthetic rubbery polymers prepared by copolymerizing a conjugated diene with said monomers can vary in consistency from liquid polymers having a viscosity from 40 to 2000 poises, preferably 200 to 900 poises at 77° F., through very soft rubbers, i.e., materials which are soft at room temperature but will show retraction when relaxed, to those having a Mooney value (ML–4) up to 100. They may be prepared by any polymerization methods known to the art, e.g., mass of emulsion polymerization.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable. Instead of using a single conjugated diene, a mixture of conjugated dienes can be employed. Thus, a mixture of 1,3-butadiene and isoprene can be employed as the conjugated diene portion of the monomer system.

The binder contains rubbery polymers of the type hereinbefore described and, in addition, there can be present one or more reinforcing agents, plasticizers, wetting agents, and antioxidants. Other ingredients which are employed for sulfur vulcanization include a vulcanization accelerator, a vulcanizing agent, such as sulfur, and an accelerator activator, such as zinc oxide. The finished binder usually contains various compounding ingredients. Thus, it will be understood that herein and in the claims, unless otherwise specified, the term "binder" is employed generically and includes various conventional compounding ingredients. The binder content of the propellant composition will usually range from 5 to 50 percent by weight.

A general formulation for the binder component of the propellant compositions of the invention is as follows:

| | Parts by weight |
|---|---|
| Rubber | 100 |
| Reinforcing agent | 0–50 |
| Plasticizer | 0–100 |
| Wetting agent | 0–10 |
| Antioxidant | 0–3 |
| Vulcanization accelerator | 0–5 |
| Sulfur | 0–2 |
| Metal oxide | 0–5 |

Reinforcing agents which can be employed include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins.

In general, any suitable rubber plasticizer can be employed in the binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxaundecyl) methane, and dioctyl phthalate are suitable plasticizers. Materials which provide a rubber having good low temperature properties are preferred. It is also frequently preferred that the plasticizers be oxygen-containing materials.

Wetting agents aid in deflocculating or dispersing the oxidizer. Aerosol OT (dioctyl ester of sodium sulfosuccinic acid), lecithin, and Duomeen C diacetate (the diacetate of trimethylenediamine substituted by a coconut oil product) are among the materials which are applicable.

Antioxidants which can be employed include catalin antioxidant CaO-6[bis(2-hydroxy-3-tertiary butyl-5-methylphenyl)sulfide] and 2,2-methylene-bis(4-methyl-6-tert-butylphenol), and the like.

Examples of vulcanization accelerators are those of the carbamate type, such as N,N-dimentyl-S-tert-butylsulfenyl dithiocarbamate and Butyl-Eight. Butyl-Eight is a rubber accelerator of the dithiocarbamate type supplied by the R. F. Vanderbilt Company and described in "Handbook of Material Trade Names," by Zimmerman and Lavine, 1953 edition, as a brown liquid; specific gravity 1.01; partially soluble in water and gasoline; and soluble in acetone, alcohol, benzol, carbon disulfide and chloroform.

It is to be understood that each of the various types of compounding ingredients can be used singly or mixtures of various ingredients performing a certain function can be employed. It is sometimes preferred, for example, to use mixtures of plasticizers rather than a single material.

The various ingredients in the propellant composition can be mixed on a roll mill or an internal mixer such as a Banbury or a Baker-Perkins dispersion blade mixer can be employed. In the final propellant the binder component forms a continuous phase with the oxidizer component being a discontinuous phase. One procedure for blending the propellant ingredients utilizes a stepwise addition of oxidizer ingredient. The binder ingredients are first mixed to form a binder mixture and the oxidizer ingredient, having the modifying agent or additive of the invention dry blended therewith, is then added to said binder mixture in increments, usually 3 to 5, but more increments can be used if desired or necessary.

After the propellant composition has been formulated as indicated above, or by other suitable mixing technique, rocket grains can be formed by any suitable technique such as casting, extrusion, or compression molding, according to procedures known to those skilled in the art.

After forming, the rocket grains are generally cured. The curing temperature will generally be in the range between about 70 to 250° F., preferably between 120 and 170° F. The curing time must be long enough to give the required creep resistance and other mechanical properties in the propellant. The curing time will generally range from around 2 hours, when the higher curing temperatures are employed, to 7 days when curing is effected at the lower temperatures.

Thus, a general formulation for the propellant compositions of the invention is as follows:

| | Parts by Weight (as set forth above) | Weight percent |
|---|---|---|
| Binder | | 5–50 |
| Oxidizer | | 95–50 |
|   Solid inorganic salt | 100 | |
|   Nitraza polymer | 5–150 | |
| High energy additive | | 0–20 |
| Burning rate catalyst | | 0–10 |

As will be evident to those skilled in the art many specific propellant formulations having a wide variety of properties, depending upon the service requirements of the propellant, can be formulated within the scope of the above general formulation. Such propellants have good physical properties and good ballistic properties, particularly high specific impulse due to the combination of fuel and oxidizer elements combined in the molecule of the nitraza polymer which constitutes a portion of the oxidant component.

For example, a more specific propellant formulation in accordance with the above is as follows:

| Ingredient | Weight percent | Weight percent |
|---|---|---|
| Binder | | 15-20 |
|   90/10 butadiene/acrylic acid copolymer, 300 poise at 25° C | 90 | |
|   Epon 562 [1] | 10 | |
| Oxidizer: | | |
|   Ammonium perchlorate | | 25-84 |
|   Nitraza polymer, 5-300 micron | | 1-40 |
| High energy additive | | 0-15 |
| Burning rate catalyst | | 0-5 |

[1] A synthetic resin possessing terminal epoxide groups, available from Shell Chemical Corporation.

The nitraza polymers of the invention can also be used in double base propellants. A general formulation for such a propellant is as follows:

Ingredient:  Weight percent
  Guncotton (nitrocellulose, 12.6–13.2% N) _____ [1] 20-60
  Nitroglycerin (desensitized and stabilized) [2] _____ [1] 20-60
  Nitraza polymer _____ 1-60
  High energy additive _____ 0-15

[1] Ratio of nitrocellulose to nitroglycerine is from 2:1 to 1:1.5.
[2] Desensitized with an ester type plasticizer such as triacetin in proportions of from 3 to 15 percent based on nitroglycerine. Stabilized with a stabilizer such as N-phenyl-N'-ethyl urea in proportions of from 1 to 8 percent based on combined nitrocellulose and nitroglycerine.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A nitraza polymeric composition of matter characterized by the formula

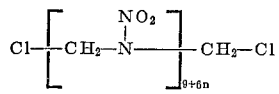

wherein $n$ is an integer of from 0 to 10.

2. A process for the preparation of a nitraza polymeric composition of matter characterized by the formula

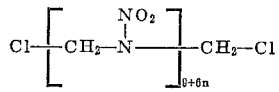

wherein $n$ is an integer of from 0 to 10, which process comprises reacting 1,7-dichloro-2,4,6-trinitraza heptane with sodium 1,3,5-trinitrazapentane.

3. A process for the preparation of a nitraza polymeric composition of matter, which process comprises reacting 1,7-dichloro-2,4,6-trinitrazaheptane with disodium 1,3,5-trinitrazapentane in a heptane to pentane mol ratio in the range of 0.8:1 to 2.0:1, in the presence of a suitable organic solvent which is inert under the reaction conditions, for a period of time in the range of 1 to 24 hours, and at a temperature in the range of 25 to 80° C.

4. A process according to claim 3 wherein said solvent is acetone.

5. A process for the preparation of a polymeric composition of matter characterized by the formula

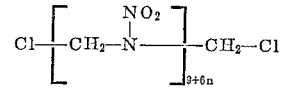

wherein $n$ is an integer of from 0 to 10, which process comprises: dissolving 1,7-dichloro-2,4,6-trinitrazaheptane in a suitable organic solvent which is inert under the reaction conditions to form a solution; adding finely divided disodium 1,3,5-trinitrazapentane to said solution in an amount such that said heptane and said pentane are present in the resulting admixture in a heptane to pentane mol ratio in the range of 0.8:1 to 2:1; refluxing said admixture at a temperature within the range of 25 to 80° C. for a period of time within the range of 1 to 24 hours; and recovering said composition of matter from the resulting reaction mixture.

6. A process according to claim 5 wherein said solvent is acetone.

7. A process for the preparation of a nitraza polymeric composition of matter characterized by a structural formula as defined in claim 5, which process comprises: dissolving 1,7-dichloro-2,4,6-trinitrazaheptane in acetone to form a solution; adding finely divided disodium 1,3,5-trinitrazapentane having a particle size in the range of 5 to 50 microns to said solution in an amount such that said heptane and said pentane are present in the resulting admixture in a heptane to pentane mol ratio in the range of 0.8:1 to 2.0:1; refluxing said admixture with stirring at a temperature in the range of 40 to 60° C. for a period of time in the range of 2 to 6 hours; separating a precipitate from the resulting reaction mixture; slurrying said precipitate with water; recovering a second precipitate from said slurry; and drying said second precipitate as the product of the process.

References Cited in the file of this patent
UNITED STATES PATENTS

| 2,627,526 | Du Brow | Feb. 3, 1953 |
| 2,740,702 | Mace | Apr. 3, 1956 |
| 2,783,138 | Parsons | Feb. 26, 1957 |
| 2,786,078 | Sauer | Mar. 19, 1957 |
| 2,978,511 | Frankel | Apr. 4, 1960 |

UNITED STATES PATENT OFFICE
CERTIFICATE OF CORRECTION

Patent No. 3,151,165                      September 29, 1964

George D. Sammons

It is hereby certified that error appears in the above numbered patent requiring correction and that the said Letters Patent should read as corrected below.

Column 8, line 3, for "sodium" read -- disodium --.

Signed and sealed this 22nd day of June 1965.

(SEAL)
Attest:

ERNEST W. SWIDER                      EDWARD J. BRENNER
Attesting Officer                      Commissioner of Patents